United States Patent [19]
Jacob

[11] Patent Number: 4,974,969
[45] Date of Patent: Dec. 4, 1990

[54] BALL CIRCULATION UNIT WITH CENTERING BARS

[76] Inventor: Werner Jacob, Briandring 29, 6000 Frankfurt am Main 70, Fed. Rep. of Germany

[21] Appl. No.: 505,048

[22] Filed: Apr. 4, 1990

[30] Foreign Application Priority Data

Apr. 8, 1989 [DE] Fed. Rep. of Germany ....... 3911501
Nov. 14, 1989 [DE] Fed. Rep. of Germany ....... 3937782

[51] Int. Cl.$^5$ .............................................. F16C 29/06
[52] U.S. Cl. ..................................................... 384/43
[58] Field of Search ..................................... 384/43–45

[56] References Cited

U.S. PATENT DOCUMENTS 3,086,824  4/1963  Barkley ................................. 384/43
4,227,751  10/1980  Albert ................................... 384/43

Primary Examiner—Thomas R. Hannon
Attorney, Agent, or Firm—Toren, McGeady & Associates

[57] ABSTRACT

A ball circulation unit in which a cage guiding balls consists of inner segments and head pieces which are axially connected to each other by centering bars so as to form one unit held in the basic member. The centering bars may be fixed in the head pieces, for example, and the centering bars increase the stiffness of the cage, permit it to be manufactured from plastics and achieve accurate centering of the cage parts relative to each other, thereby ensuring undisturbed circulation of the balls in the ball rows.

7 Claims, 2 Drawing Sheets

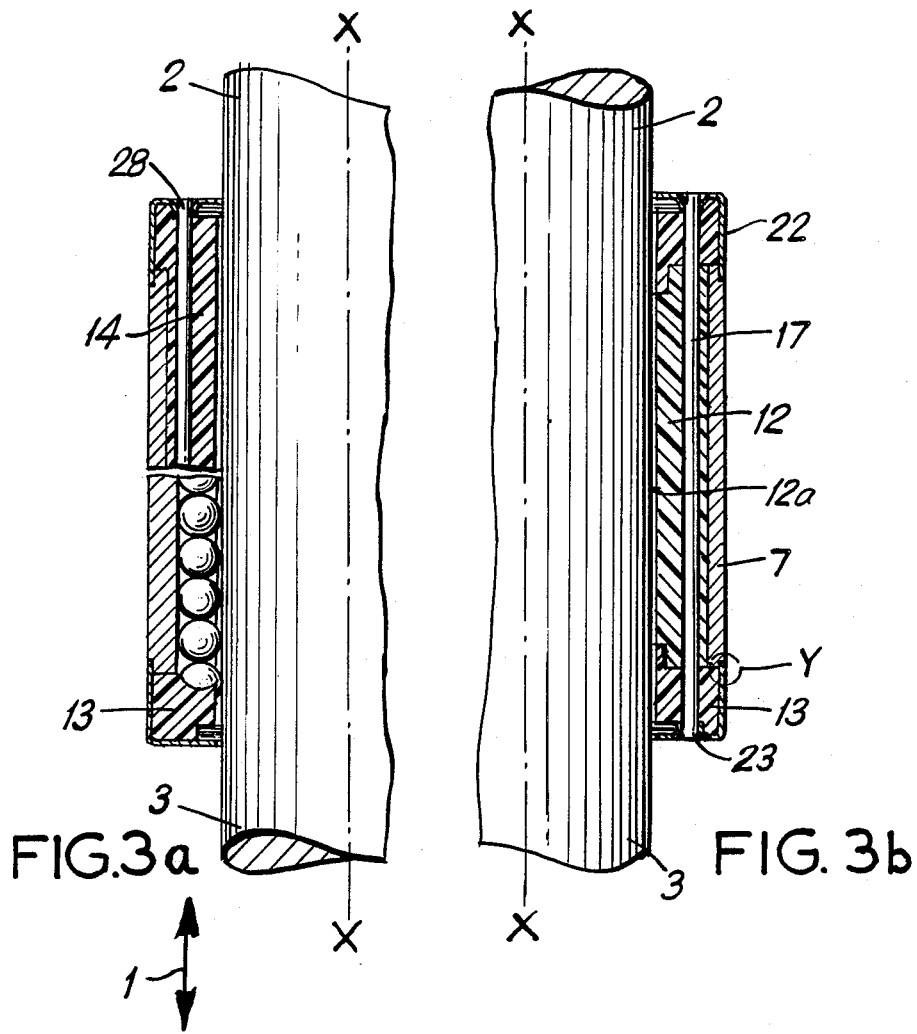
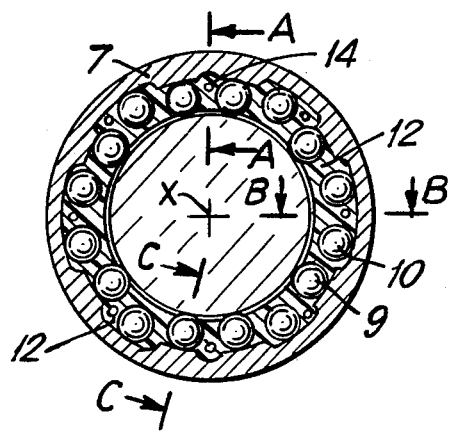
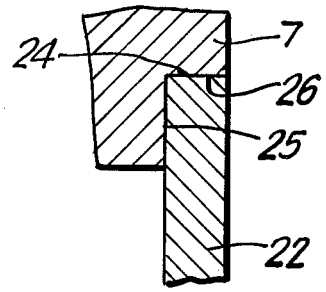
FIG.3a FIG.3b
FIG.4 FIG.5

BALL CIRCULATION UNIT WITH CENTERING BARS

BACKGROUND OF THE INVENTION

The invention relates to a ball circulation unit for a linear ball guide, which is movable along the longitudinal axis of a guiding rail which has a circular cross-section and which it embraces at least partially, having several cross-sectionally distributed continuous rows of balls which are guided in a multi-component cage, each of which components comprises a carrying portion in which the balls, from the cage, project radially inwardly, while resting on the guiding rail; a returning portion and deflecting portions connecting the two at their ends, with the carrying portion and the returning portion each extending parallel to the longitudinal axis and with the cage parts each forming guiding grooves for the balls, being connected to each other via centering bars and being accommodated in a basic member.

With ball circulation guiding means it is known to provide the outer carrying tracks on which the balls are supported in the carrying portion in the form of individual track segments. The individual track segments are received in support means. The cage for guiding the balls is usually designed in one part.

SUMMARY OF THE INVENTION

It is the object of the present invention to provide a ball circulation unit whose cage is easier to produce, but at the same time has the degree of stability necessary for aligning and guiding the balls.

Pursuant to this object and others which will become apparent hereafter, one aspect of the present invention resides in the parts forming the cage comprising bores into which continuous centering bars are inserted which axially fix the cage parts relative to the basic member.

This design permits the cage to be manufactured from plastics and although it is composed of different segments and individual parts, it achieves the degree of stiffness required for safely guiding the balls.

Depending on the design of the ball circulation unit, the centering bars may be fixed in different ways. According to a first embodiment of the invention, the centering bars are fixed relative to head pieces representing an axial finish. If additionally there are provided end plates whose ends are supported on the head pieces, the centering bars are fixed relative to the end plates.

It is also possible for the head pieces associated with the cage to be covered by caps which are centered at the ends of the basic member and relative to which the centering bars are fixed.

In a further embodiment, the centering bars axially pass through the webs of the inner segments of the cage between two adjoining carrying portions of the ball rows. With this arrangement, the stability of the cage is increased especially in the circumferential direction.

Preferably, the centering bars are fixed by welding, caulking or bolting.

To increase the stiffness of the cage further, the invention proposes that the centering bars, when fixed, should be in a pretensioned condition.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 shows an alternative design where the head pieces are covered by caps, with the partial sections 3a, 3b and 3c representing sections according to FIG. 4 along lines A—A, B—B and C—C;

FIG. 4 is a cross-section through an embodiment according to FIG. 3; and

FIG. 5 shows a detail Y according to FIG. 3 in a magnified form.

DETAILED DESCRIPTION OF PREFERRED EMBODIMENTS

Figure 1:
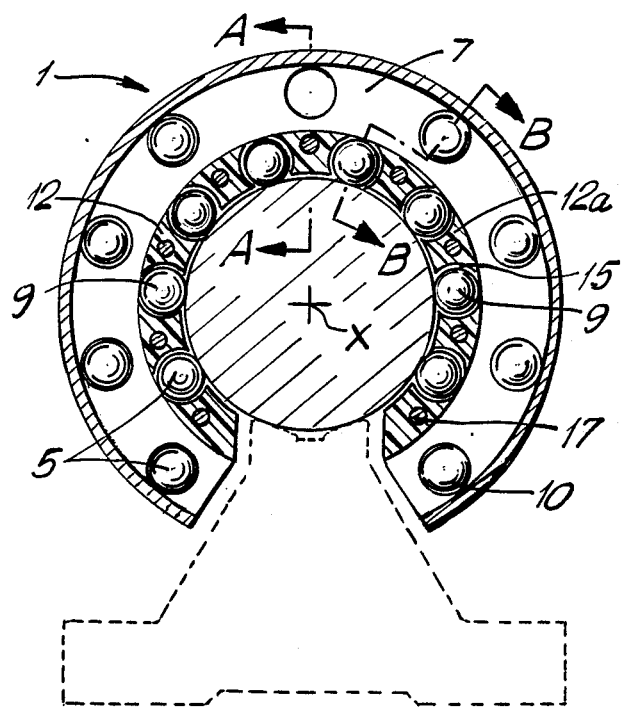
FIG. 1 shows a cross-sectional view of a first embodiment of the invention having a slotted version of a basic member and a cage consisting of segments (section C—C according to FIG. 2)
Figures 2A, 2B:
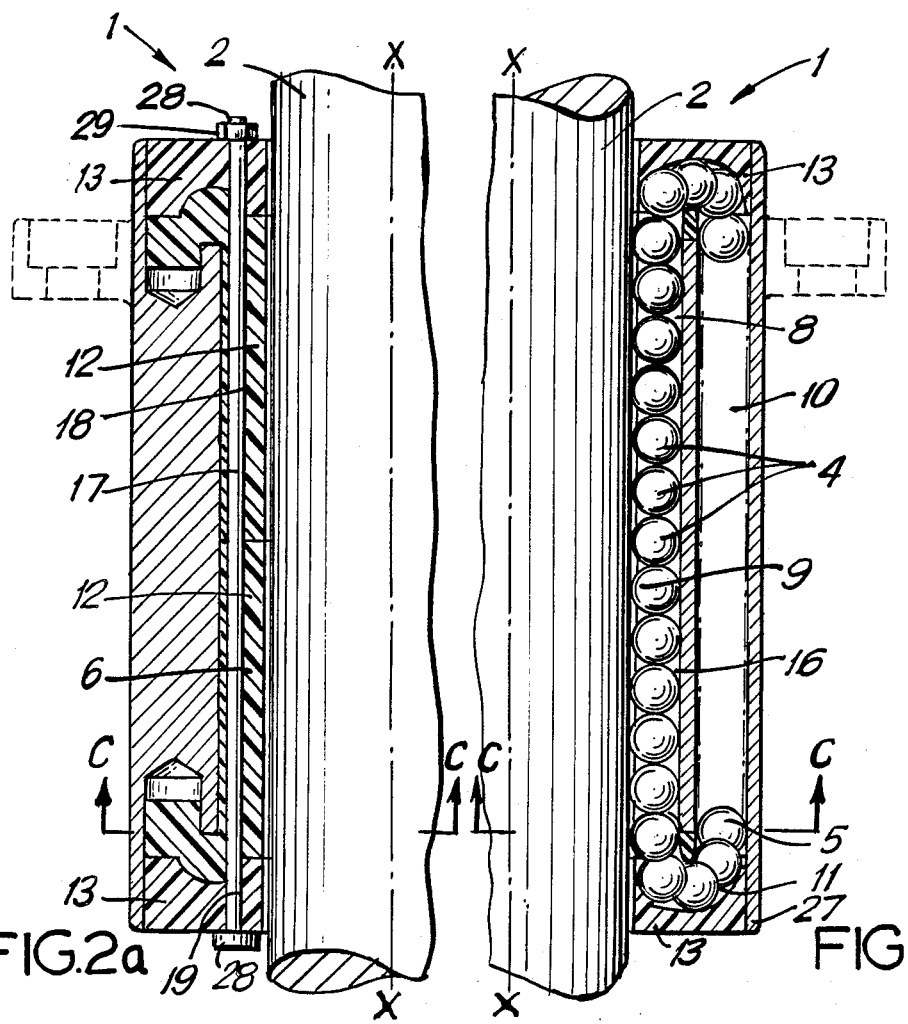
FIG. 2 shows different longitudinal sections in the right-hand and left-hand half of the figure, with section 2a corresponding to section A—A of FIG. 1 and, in the right-hand half (FIG. 2b) section B—B corresponding to FIG. 1.

The ball circulation unit according to FIGS. 1 and 2 serves to support a table or machine part on a guiding rail 2. The guiding rail 2 has a circular cross-section and may be fixed on a base by a fixing element. The guiding rail 2 may form part of the fixing element or it may be connected to it via suitable threaded connections. The ball circulation unit 1 is slotted in its cross-section and partially embraces the guiding rail 2. The ball circulation unit 1 comprises 8 (eight) circumferentially arranged ball rows 5.

Each individual ball row 5 consists of a carrying portion 9 in which the balls 4 contained in this portion project radially inwardly from the cage 6 and rest against the outer face 3 of the guiding rail 2. Furthermore, the balls 4 contained in the carrying portion 9 are radially supported on the running face 8 formed by the bore of the basic member 7. The carrying portions 9 of each ball row 5 are connected to the returning portion 10 via deflecting portions 11. In the deflecting portions 11 and the returning portion 10 the balls 4 are guided with play so as to be load-free. In these portions the balls 4 are not in contact with the guiding rail 2. The carrying portions 9 and the returning portions 10 extend parallel to the longitudinal axis x—x of the guiding rail 2 and thus to the axis of the bore of the basic member 7.

The cage 6 for guiding the balls consists of several components, i.e. the inner segments 12 connected by circumferentially distributed webs 12a forming guiding grooves 15 laterally guiding the balls 4 in the carrying portions 9, and of head pieces 13 centered on these at their ends. In the region of the deflecting portions 11, the head pieces 13 and inner segments 12 form guiding grooves 16. For stabilizing the cage 6 and especially the webs 12a of the inner segments 12, as well as the head pieces 13, there have been provided centering bars 17.

The centering bars 17 are inserted into the bores 18 of the webs 12a of the inner segments 12 as well as into corresponding bores 19 of the head pieces 13. The bores 19 in one of the head pieces 13 may be designed as threaded bores into which the centering bars 17 are screwed with their threaded end 28. These bores 19 of the other head piece 13 may be designed as through-bores from which the threaded ends 28 of the centering bars 17 project, with nuts 29 being screwed on to the ends 28. The inner segments 12 and the head pieces 13 are tensioned relative to each other by tightening the nuts 29. In the process, the cage 6 consisting of these parts is also axially fixed in the basic member 7. The inner segments 12 and head pieces 13, at their ends, are received in enlarged bore portions of the basic member 7 and are supported on the axial end faces of these enlarged bore portions.

With the embodiments of FIGS. 3 to 5, the cage is assembled of inner segments 12 and head pieces 13. Both the head pieces 13 and the inner segments 12 comprise webs 14 and 12a respectively which engage between adjoining carrying portions 9 of the balls 4, and guide the balls 4. The webs 14 and 12a of the head pieces 13 and inner segments 12 are also penetrated by centering bars 17 received in complementary bores 18 and 19. Additionally, the head pieces 13 are enclosed by caps 22 whose end face is also provided with bores 23 in which the ends 28 of the centering bars 17 are fixed. Fixing may be effected by bolting, caulking or spot welding. The cap 22 is received on a centering face 25 of the basic member 7 and with its end face 24 it is axially supported on the radially extending supporting face 26 of the basic member 7.

The caps 22 may be made of metal, for example. This makes it possible to give the basic member 7a particularly simple design. The stepped bore provided at the end of the basic member in the embodiment of FIGS. 1 and 2 is eliminated.

While the invention has been illustrated and described as embodied in a ball circulation unit with centering bars, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

I claim:

1. A ball circulation unit for a linear ball guide, which unit is movable along the longitudinal axis of a guiding rail having a circular cross-section and embraces the rail at least partially, comprising: a basic member (7); several cross-sectionally distributed continuous rows of balls which are guided in a multi-part cage (6), each of the rows of balls including a carrying portion in which the balls, from the cage, project radially inwardly, while resting on the guiding rail, a returning portion and deflecting portions connecting the carrying portion and returning portion at their ends, the carrying portion and the returning portion each extending parallel to the longitudinal axis, and the cage parts each forming guiding grooves for the balls and being accommodated in the basic member; and continuous centering bars (17) arranged so as to connect the cage parts to each other, the cage parts (12, 13) having bores (18, 19) into which the continuous centering bars (17) are inserted so as to axially fix the cage parts (12, 13) relative to the basic member (7).

2. A ball circulation unit according to claim 1, wherein the cage parts include head pieces (13), the centering bars (17) being fixed relative to the head pieces (13).

3. A ball circulation unit according to claim 2, wherein the centering bars (17) are fixed relative to end plates (28) which are supported on the head pieces (13).

4. A ball circulation unit according to claim 1, wherein the cage parts include head pieces (13), and further comprising caps (22) which cover the head pieces (13) associated with the cage (6), the caps (22) being centered at the ends of the basic member (7) and the centering bars (17) being fixed relative to the caps (22).

5. A ball circulation unit according to claim 1, wherein the cage parts include inner segments (12) having webs (12a) between two adjoining carrying portions (9) of the ball rows (5), the centering bars (17) being arranged so as to axially pass through the webs (12a) of the inner segments (12) of the cage.

6. A ball circulation unit according to claim 1, wherein the centering bars (17) are fixed by one of welding, caulking and bolting.

7. A ball circulation unit according to claim 1, wherein the centering bars (17) are in a pretensioned condition when fixed.

* * * * *